(12) United States Patent
Locke et al.

(10) Patent No.: US 10,678,278 B2
(45) Date of Patent: Jun. 9, 2020

(54) DYNAMIC CONTROL OF FAN FLOOR

(71) Applicant: Dell Products L.P., Round Rock, TX (US)

(72) Inventors: Kevin Locke, Georgetown, TX (US); Travis North, Cedar Park, TX (US); Joohyun Woo, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 15/461,149

(22) Filed: Mar. 16, 2017

(65) Prior Publication Data

US 2018/0267566 A1    Sep. 20, 2018

(51) Int. Cl.
*G05D 23/19* (2006.01)
*G06F 1/20* (2006.01)

(52) U.S. Cl.
CPC ......... *G05D 23/1919* (2013.01); *G06F 1/206* (2013.01); *G06F 2200/201* (2013.01); *Y10S 236/09* (2013.01)

(58) Field of Classification Search
CPC ........... G05D 23/1917; G05D 23/1919; G05B 19/048; G05B 2219/42; H05K 7/20209; H05K 7/20727; H05K 7/20836; G06F 1/206; G06F 2200/201; Y10S 236/09
USPC ...................................................... 700/300
See application file for complete search history.

(56) References Cited

U.S. PATENT DOCUMENTS

| | | | |
|---|---|---|---|
| 2003/0133242 A1* | 7/2003 | Buchholz | F01P 7/042 361/103 |
| 2007/0250215 A1* | 10/2007 | Jia | G05B 13/048 700/274 |
| 2009/0297199 A1* | 12/2009 | Yamashina | G03G 15/2039 399/70 |
| 2012/0150509 A1* | 6/2012 | Shiel | G06Q 10/04 703/2 |
| 2013/0105107 A1* | 5/2013 | Chen | H05K 7/20745 165/11.1 |
| 2013/0261809 A1* | 10/2013 | Morrow | G05D 23/1917 700/278 |
| 2014/0032011 A1* | 1/2014 | Artman | G05D 23/1932 700/300 |
| 2014/0230466 A1* | 8/2014 | Noll | F04C 23/001 62/89 |
| 2014/0233176 A1 | 8/2014 | Montero | |
| 2017/0339804 A1* | 11/2017 | Ingalz | H02M 1/4208 |

* cited by examiner

*Primary Examiner* — James J Lee
*Assistant Examiner* — Michael W Choi
(74) *Attorney, Agent, or Firm* — Norton Rose Fulbright US LLP

(57) ABSTRACT

Controlling an activation status of a proportional-integral-derivative (PID) controller for an information handling system cooling system, such as the on/off status of the PID controller, can reduce power consumption and processing and memory requirements for such a system. A decrease in resource consumption can be realized by deactivating the PID controller during certain periods and activating the PID controller during others. For example, the PID controller can be deactivated when a temperature of a system component falls below a threshold temperature and activated when the temperature of the system component rises above the threshold temperature.

18 Claims, 5 Drawing Sheets

DYNAMIC CONTROL OF FAN FLOOR

FIELD OF THE DISCLOSURE

The instant disclosure relates to cooling systems for information handling systems. More specifically, portions of this disclosure relate to controlling an activation status of a proportional-integral-derivative (PID) controller of an information handling system cooling system.

BACKGROUND

As the value and use of information continue to increase, individuals and businesses seek additional ways to process and store information. One option available for such a purpose is the information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with respect to the information handled, how the information is handled, how much information is processed, stored, or communicated, and how quickly and efficiently the information may be processed, stored, or communicated. Variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Processors, graphics cards, random access memory (RAM), and other components in information handling systems have increased in clock speed, transistor density, and/or power consumption and/or decreased in size, causing the amount of heat per unit area produced by such components during normal operation to increase. The temperatures of these components should be kept within a reasonable range to prevent overheating, instability, malfunction, damage, and shortened component lifespan. Cooling systems (e.g., cooling fans, blowers, and liquids) are used to cool information handling systems and their components.

The operation of cooling fans (e.g., adjustment of rotational speed of cooling fans) in information handling systems can be controlled by a proportional-integral-differential (PID) closed-loop control system. Typical PID closed-loop control is based on a mathematical equation summing proportional (P), integral (I), and differential (D) terms of the variable (e.g., cooling fan speed) being controlled. Performing the calculations for generation of PID control signals can place a greater demand on system resources than running the cooling fans at a constant speed. Thus, traditional PID control implementations can increase the computing power, memory, and power consumption requirements of cooling systems.

Shortcomings mentioned here are only representative and are included simply to highlight that a need exists for improved cooling control systems, particularly for cooling control systems implemented in information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Controlling an activation status of a proportional-integral-derivative (PID) controller for an information handling system cooling system, such as the on/off status of the controller, can reduce power consumption and processing and memory requirements for such a system. The PID controller may be deactivated during certain time periods and activated during other time periods. While the PID controller is deactivated power consumption may be reduced and/or the system resources consumed by the PID controller may be available for other uses. Further benefits can be achieved by tuning the PID controller activation and deactivation to occur based on past usage of the information handling system. A decrease in power consumption and computing and/or memory requirements resulting from deactivation and tuning of the PID controller activation status may enhance information handling system efficiency and reduce system operation costs.

A method for controlling a cooling system can activate and deactivate a PID controller based on a process value. The method may include receiving a process value of a system component. Examples of a process value include a temperature margin or a temperature of the system component. The received process value may be compared to a set process value, such as a set temperature margin or set PID temperature floor. A PID controller configured to generate a control signal for a cooling fan may then be activated and deactivated based, at least in part, on the comparison of the process value of the system component and the set process value. For example, the PID controller may be activated when the comparison indicates that a temperature of the system component is greater than or equal to a threshold system component temperature. The PID controller may be deactivated when the comparison indicates that the temperature of the system component is less than the threshold system component temperature. In some embodiments, the PID controller may be deactivated when a received temperature margin is greater than a set temperature margin and may be activated when a received temperature margin is less than or equal to a set temperature margin. The set process value may be selected such that the PID controller is activated with sufficient time to allow the cooling system to keep the system component temperature at or below a maximum system component temperature.

The method may further include receiving a parameter related to a fan speed of the component cooling fan, such as an actual fan speed of the component cooling fan. The step of activating and deactivating the PID controller may be based, at least in part, on the parameter related to the fan speed of the cooling fan. The PID controller may be deactivated when the system component temperature margin is greater than the set temperature margin and the fan speed is less than or equal to an idle fan speed. Taking fan speed into account can allow the cooling fan time to slow down to an idle speed, even if the temperature margin is greater than the set temperature margin. Thus component stress is avoided that could result from deactivating, or sharply reducing the speed of, a cooling fan operating at a high speed.

The set process value may be dynamically adjusted, such as to a set temperature margin or set PID temperature floor, based, at least in part, on the received system component process value. For example, a set temperature margin may be increased when the system component temperature margin is less than the set temperature margin. Thus, the set process value may be increased when the system component process value is less than the set process value. The set process value may also be decreased when the system component process value is greater than the set process value. For example, a set temperature margin may be decreased when the system component temperature margin is greater than the set temperature margin.

The set process value may be dynamically adjusted based on historical records regarding one or more process values. Thus, the threshold for activation and deactivation of the PID controller may be selected based on to the usage habits of a user of the information handling system in which the controller is implemented. A record of process values may be logged over time. A set temperature margin may be decreased when, or only when, the received component temperature margin has exceeded the set temperature margin by at least a set temperature for at least a set time period. A set PID temperature floor may be increased when, or only when, the received component temperature has been less than the set PID temperature floor by at least a set temperature for at least a set time period. In these examples, the set temperature margin or PID temperature floor may be dynamically adjusted based on system usage. Cooling fans require time to increase in speed to achieve maximum speed and cooling capacity. If a system is more likely to experience heavy use and therefore substantial heat generation, implementing a lower floor for PID activation can help the system adequately cool components, increasing the range of temperatures for which the PID controller is active and allowing the fan more time to increase in speed. If the system rarely or never experiences heavy use, a high PID activation floor can minimize PID controller activation, and thus reduce noise from fans when increasing in speed and operating at high speeds.

According to another embodiment, an apparatus for controlling a component cooling system of an information handling system may include a cooling fan and a controller coupled to the cooling fan to control the cooling fan. The controller may be configured to perform steps for activating and deactivating a PID controller of an information handling system cooling system similar to those described above.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between hardware components.

Information handling systems may also include cooling systems that cool the various pieces of equipment therein. An information handling system may provide a controlled environment, such as a data center, a personal computer, or a mobile device, that may be monitored, and cooling systems may be controlled to regulate environmental conditions inside the information handling system to certain specifications. Furthermore, cooling systems may be controlled to regulate temperatures and other related parameters of specific system components of information handling systems. For example, a temperature and/or a humidity of the information handling system or system component may be monitored and the cooling systems controlled to keep the temperature and the humidity in a desired range. Further, conditions outside the device may be monitored and used as part of a control system for the cooling systems.

Figure 1:
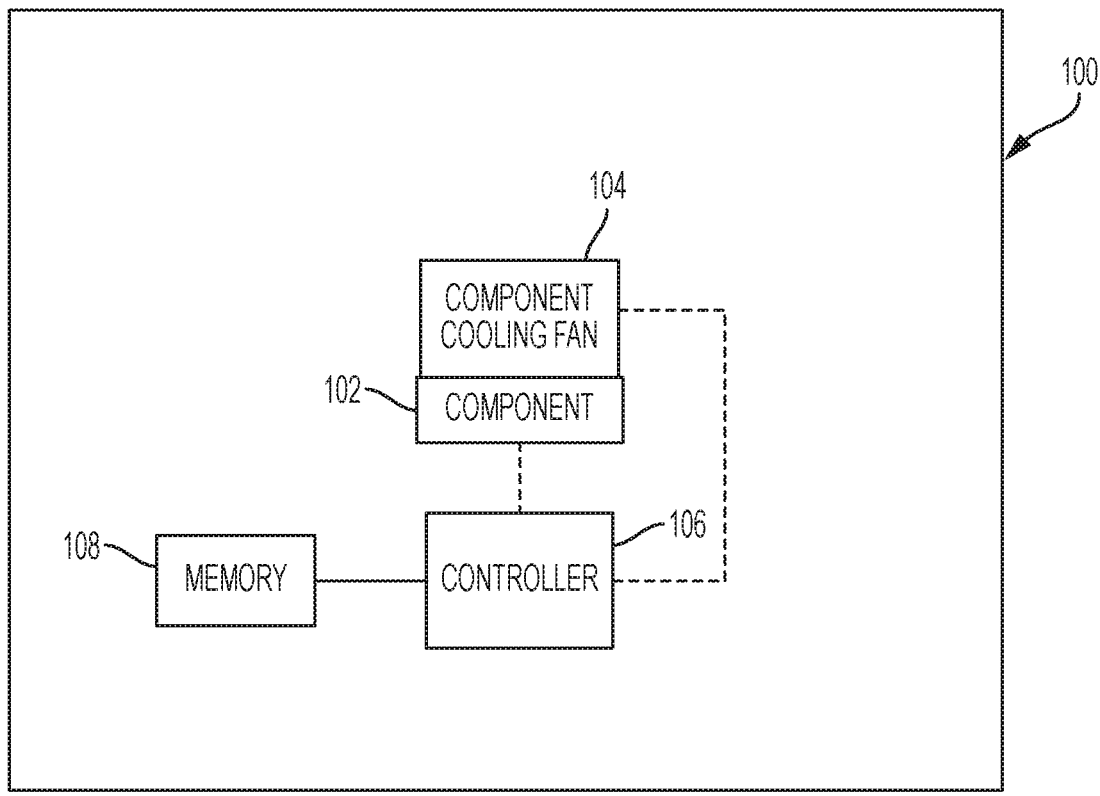
FIG. 1 block diagram illustrating a cooling system for a system component of an information handling system according to some embodiments of the disclosure.

PID controllers may be used to control cooling systems for system components of information handling systems. Such controllers may consume power and use processing resources and memory. Thus, deactivating PID controllers during certain times, rather than being always on, may improve system performance. Activation of PID controllers may also be adjusted to the specific usage habits of a user to further improve cooling system performance FIG. 1 is a block diagram of a cooling system 100 for a system component 102 of an information handling system according to an embodiment of the disclosure. A system component 102, such as a CPU, memory, hard drive, or PCIe peripheral, may be cooled by a component cooling fan 104. A controller 106 may receive a process value for the system component 102, such as a component temperature or a component temperature margin. The controller 106 may activate and deactivate a PID controller, which may be integrated with or external to the controller 106. The PID controller may be configured to generate a control signal for the cooling fan 104 based on the received process value. The control signal may be a PWM control signal. The PID controller may also be configured to generate control signals for other cooling fans, such as system cooling fans or other component cooling fans. The controller 106 may receive a parameter related to a speed of the cooling fan 104, and the activation and deactivation of the PID controller may be based, in part, on the received parameter. Received process values and parameters may be stored in a memory integrated with the controller 106 or in system memory 108. Although a PID controller is described with respect to controller 106, the controller 106 may be another kind of controller or implement a different control algorithm and still be activated and deactivated in accordance with example embodiments provided herein.

The cooling system for a system component 102 of an information handling system 100 may include a water cooling system. The water cooling system may include a network of tubes to allow water to flow near to and cool the component, a pump to cause the water to flow through the network, and a radiator with at least one fan to control the temperature of the water. The controller 106 may receive a process value for a system component 102 such as a component temperature or a component temperature margin. The controller 106 may activate and deactivate a PID controller configured to generate at least one control signal for control of the water cooling system based on the received process value. The at least one control signal may control the flow rate of water through the water cooling system by controlling a speed of the pump and/or the temperature of the water by controlling a speed of the at least one fan of the radiator. The controller 106 may also receive a parameter related to a speed of the pump or a speed of the at least one fan of the radiator, and the activation and deactivation of the PID controller may be based, in part, on the received parameter.

Figure 2:
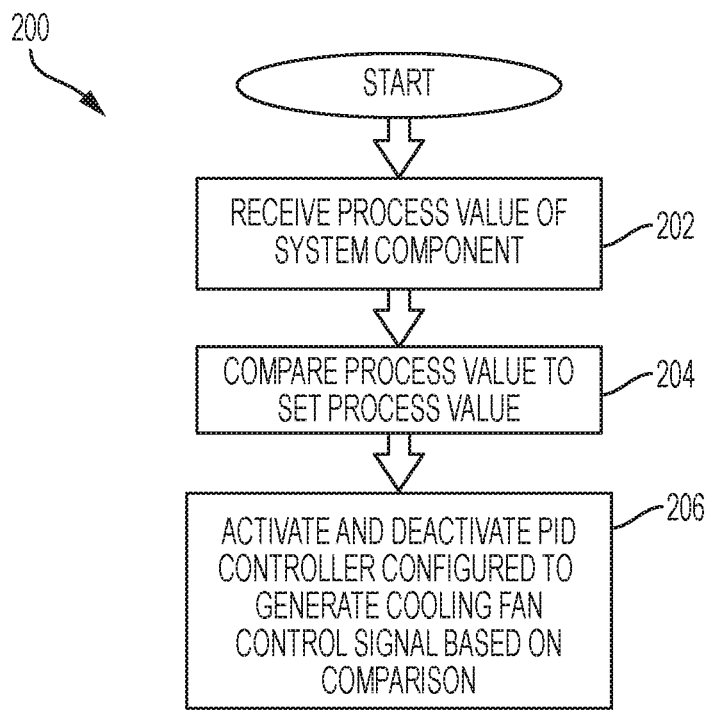
FIG. 2 is a flow chart illustrating an example method for controlling a component cooling system of an information handling system according to some embodiments of the disclosure.

FIG. 2 is a flow chart illustrating an example method 200 for operating a component cooling system of an information handling system. The method 200 may begin at step 202 with receiving a process value of a system component. The system component process value may be compared, at step 204, with a set process value. At step 206, a PID controller may be activated and deactivated based on the comparison. The cooling fan control signal may be generated to control a cooling fan. A cooling fan may be a system cooling fan configured to cool the system generally or a system component cooling fan configured to cool a specific component of the system.

Figure 3:
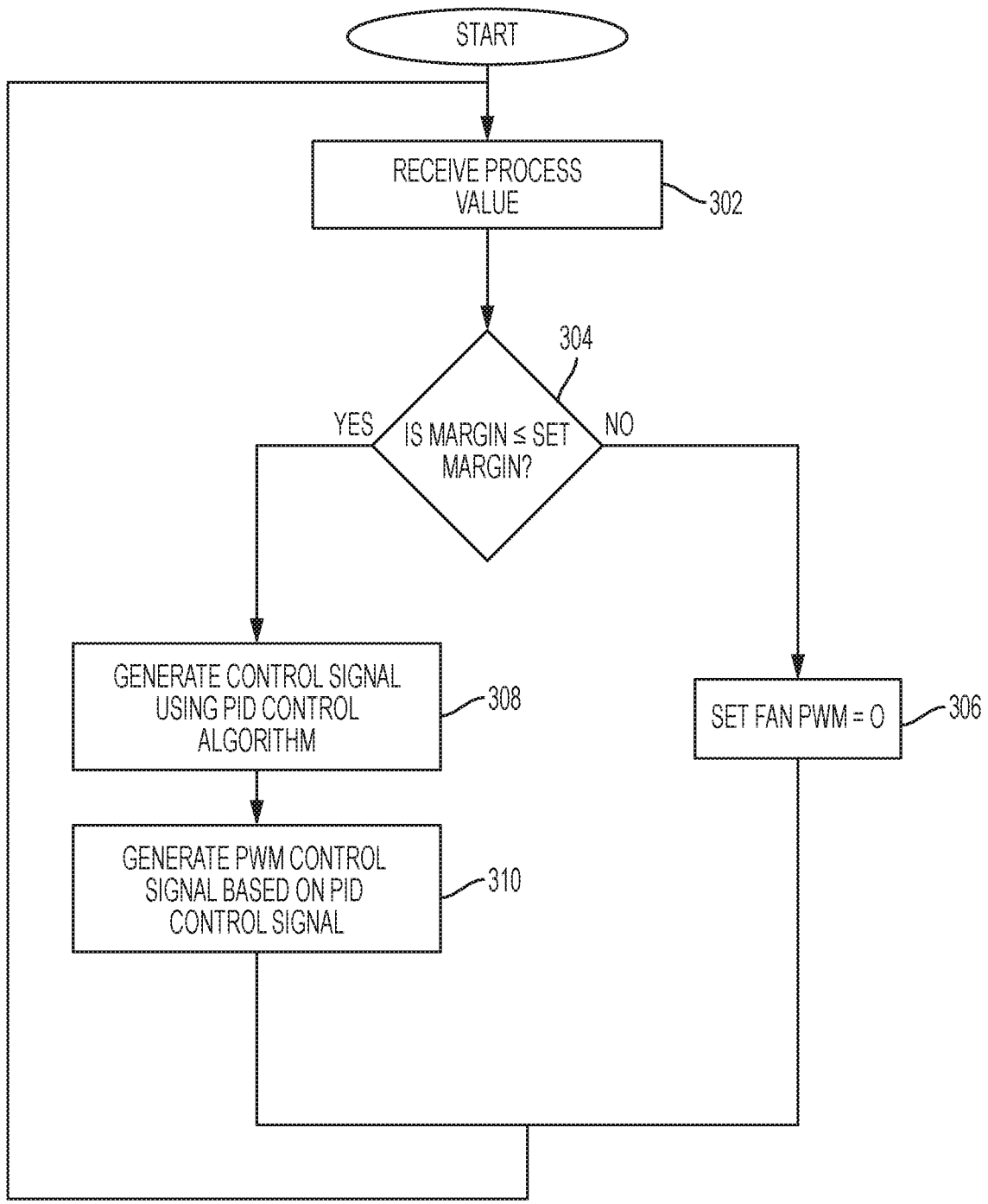
FIG. 3 is a flow chart illustrating an example method for controlling a component cooling system of an information handling system according to some embodiments of the disclosure.

FIG. 3 is a flow chart illustrating a further example method 300 for operating a component cooling system of an information handling system according to some embodiments of the disclosure. The method 300 may begin with receiving a process value at step 302. Received process values may include a temperature or temperature margin of a component, such as a CPU, hard drive, or memory. A component temperature margin may include a difference between a maximum acceptable temperature of the component, such as a CPU junction temperature, and the component's temperature.

At step 304, the received process value may be compared with a set process value. The comparison may include determining whether a component temperature margin is less than, or less than or equal to, a set temperature margin. The comparison of step 304 may also include determining whether a received component temperature is within or above a set temperature margin or whether a received component temperature is above, or is equal to, a set PID temperature floor. If the received margin is greater than the set temperature margin or the received component temperature is below the PID temperature floor or below the set temperature margin, the PID controller may be deactivated, and the fan may be turned off or set to an idle speed at step 306. If the PID controller is already in an inactive state, it may remain in the inactive state. If the temperature margin is less than the set temperature margin or the received component temperature is greater than the set PID temperature floor or is within or above the set temperature margin, the PID controller may be activated and may generate a PID control signal for the cooling fan at step 308. A pulse-width-modulation (PWM) control signal may then be generated based on the PID control signal and delivered to the cooling fan at step 310. The method may be repeated as desired. For example, the method may be repeated at periodic intervals, such as every 100 milliseconds, or repeated at non-periodic intervals at events, such as when a certain change in a component temperature has occurred.

Figure 4:
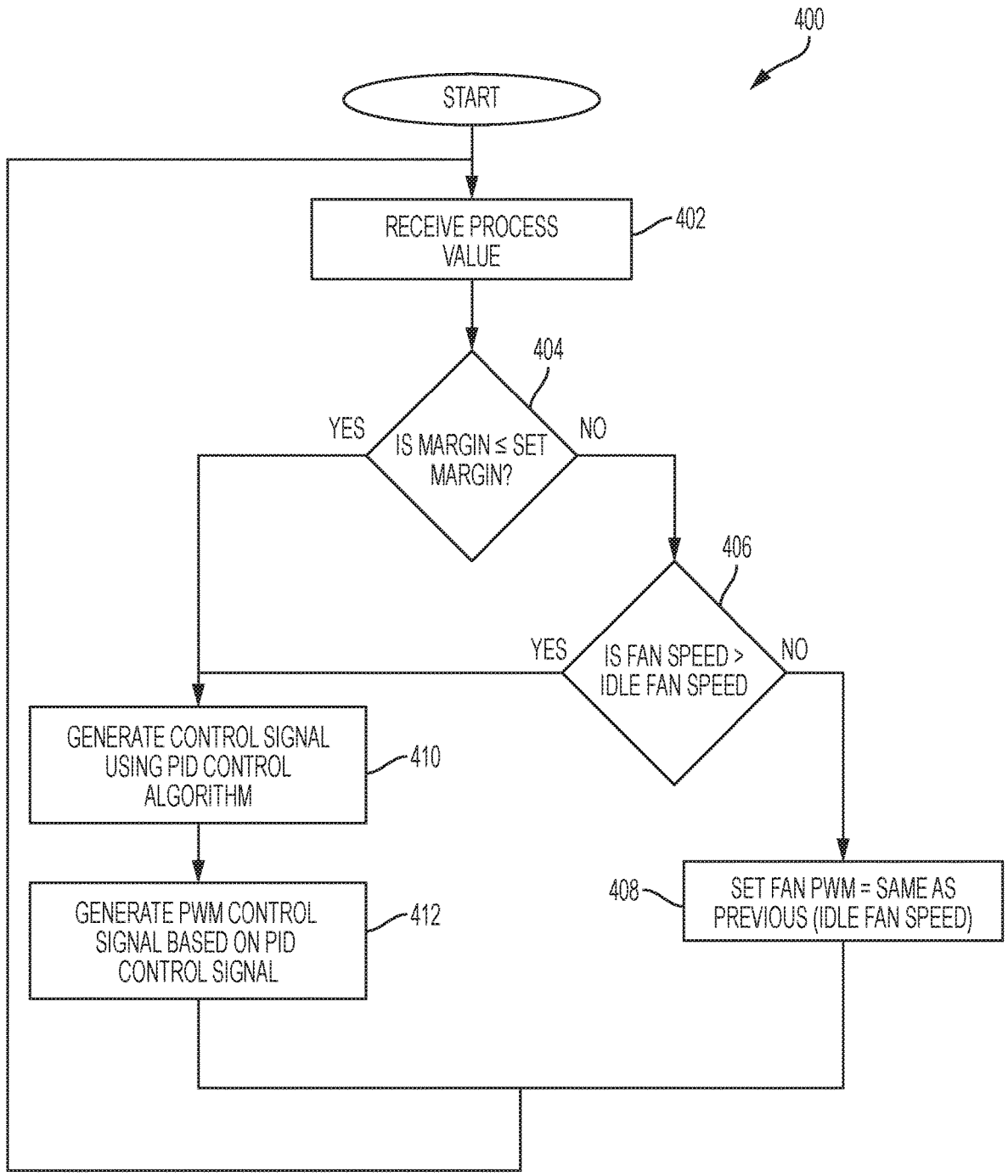
FIG. 4 is a flow chart illustrating an example method for controlling a component cooling system of an information handling system according to some embodiments of the disclosure.

Other factors, in addition to the received process value, may be used to determine whether to activate or deactivate a PID controller. FIG. 4 is a flow chart illustrating an example method 400 for operating a component cooling system of an information handling system according to some embodiments of the disclosure. The method 400 may begin with receiving a process value at step 402, such as a temperature of a component or a temperature margin of a component. A component temperature margin can be a value representative of a difference between a maximum acceptable temperature of a component and the component's temperature.

The method 400 may proceed to step 404 to compare the received process value with a set process value. The comparison of step 404 may include determining whether a component temperature margin is less than a set temperature margin, or, in some cases, less than or equal to a set temperature margin. The comparison may also include determining whether a received component temperature is within or above a set temperature margin or whether a received component temperature is above, or is equal to, a set PID temperature floor. At step 406, a parameter related to a fan speed, such as an actual fan speed, may also be received, and may be compared with a threshold fan parameter, such as an idle fan speed. Evaluating fan speed can allow the system to decrease the speed of cooling fans over time, instead of simply reducing the speed of the cooling fans to an idle or minimum speed immediately which can result in reduced component lifetime. If the received temperature margin is greater than the set temperature margin and a received fan speed is less than or equal to an idle fan speed or other fan speed threshold, the PID controller may be deactivated at step 408. If a temperature of the component is below a PID temperature floor or below the set temperature margin and a received fan speed is less than or equal to an idle fan speed or other fan speed threshold, the PID controller may also be deactivated. Deactivation of the PID controller may cause the fan to run at an idle or minimum speed. Alternatively, deactivation may cause the fan to cease operation. If the PID controller is already in an inactive state, it may remain in the inactive state. Returning to block 404, if the temperature margin is less than the set temperature margin, the received component temperature is greater than, or equal to, the set PID temperature floor or is inside or above the set temperature margin, or the fan speed is greater than an idle fan speed or other set fan speed threshold, the PID controller may be activated and may generate a PID control signal for the cooling fan at step 410. A pulse-width-modulation (PWM) control signal may then be generated based on the PID control signal and may be delivered to the cooling fan at step 412. The method 400 may be repeated periodically or in response to certain events.

Figure 5:
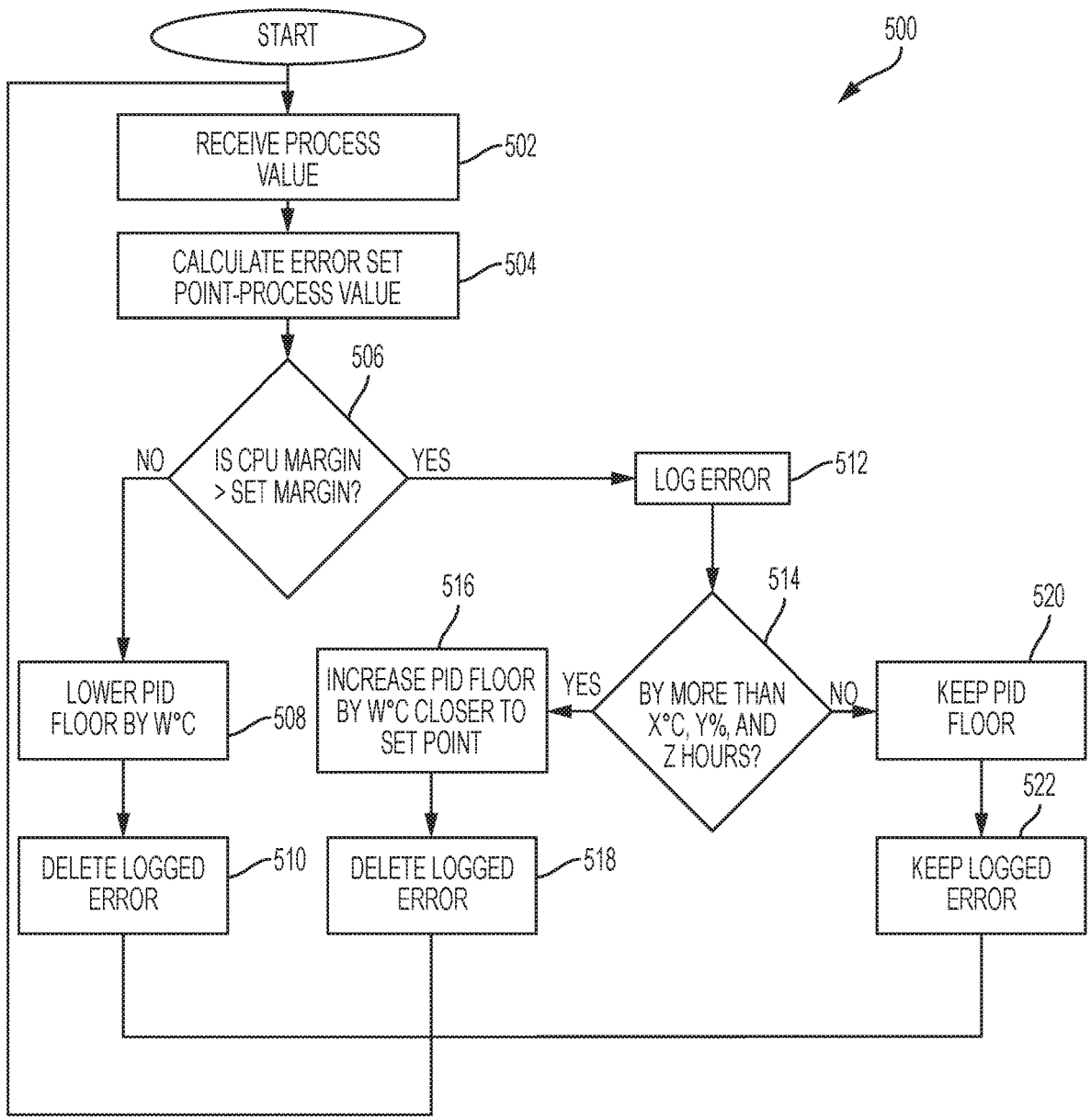
FIG. 5 is a flow chart illustrating an example method for controlling a component cooling system of an information handling system according to some embodiments of the disclosure.

Fan control may be adjusted based on past system behavior or a user profile of expected system behavior. FIG. 5 is a flow chart illustrating a further example method 500 for operating a component cooling system of an information handling system according to some embodiments of the disclosure. The method 500 may begin with receiving a process value at step 502. The process value may be a component temperature margin or a component temperature. An error value may then be calculated in step 504 by determining a difference between a set point and the received process value. The set point may be a maximum component temperature or a maximum PID temperature floor.

The method 500 may then proceed to step 506 to compare the received process value with the set process value. The comparison may involve determining whether a component temperature margin is greater than a set temperature margin. The comparison may also include determining whether a received component temperature is below a set temperature margin or a set PID temperature floor. If the component temperature margin is greater than the set temperature margin, or if the received component temperature is below the set PID temperature floor or within or above the set temperature margin, the calculated error may be logged in a memory at step 512. Other parameters, such as the received process value, may also be logged in the memory. The calculated error, and other logged parameters, may be associated with a user profile. In some embodiments, the user profile may be associated with a particular user account, a particular information handling system, or a particular set of information handling systems. The recorded parameters may be used to understand system usage by particular users and to develop a usage profile to improve fan control. A usage profile may contain temperature values and other system usage parameters, such as CPU utilization, memory utilization, and hard drive sleep time, that have been recorded during use by a particular user.

After the error is logged, a determination may be made as to whether a timing threshold has been met at step 514. The determination may include comparing a received process value with a set process value over a period of time. For example, the determination may involve examining whether a received temperature of the component has dropped below a PID temperature floor or the bottom of a set temperature margin by at least ten degrees Celsius for at least two hours. Alternatively, such a determination may involve determining whether a received temperature margin has exceeded the set temperature margin by a specific temperature or a specific percentage of the set temperature margin for a predetermined period of time. If the timing requirement has been met, the set process value may be adjusted accordingly at step 516. For example, if the set process value is a temperature floor for activating PID control, the temperature floor may be raised by a predetermined amount, such as one degree Celsius, or, if the set process value is a set temperature margin, the set temperature margin may be decreased by a predetermined amount, such as one degree Celsius. The method may also include determining whether the set temperature margin is greater than a minimum temperature margin or whether the PID temperature floor is less than a maximum PID temperature floor. If the set temperature margin is not greater than the minimum temperature margin or the PID temperature floor is not less than the maximum PID temperature floor, the set temperature margin or the PID temperature floor may remain unchanged, even if the timing requirement has been met. Adjustment of the set process value can reduce the volume of sound generated by cooling fans by activating fans fewer times. In some embodiments, the control system may then erase the logged error and recorded parameters used to determine if the timing requirement of step 514 is met, at step 518. If the timing threshold is not met, the set process value, such as a PID temperature floor, may remain unchanged at step 520. If the set process value remains unchanged, the logged error may be retained in memory at step 522 and used to determine if the timing requirement has been met if the method is repeated. The method may then be repeated periodically or in response to an event.

The component temperature margin may be less than or equal to the set temperature margin, or a received component temperature may exceed a set PID temperature floor or may be within or above a set temperature margin. When this occurs, the set temperature margin may be expanded or the PID floor may be lowered by a predetermined amount, such as 1 degree Celsius, at step 508. The method may also include determining whether the set temperature margin is less than a maximum temperature margin or whether the set PID temperature floor is greater than a minimum PID temperature floor. If the set temperature margin is not less than the maximum temperature margin or the set PID temperature floor is not greater than the minimum PID temperature floor, the set temperature margin or the PID temperature floor may remain unchanged, even if the other requirements for expanding the set temperature margin or lowering the PID floor have been met. Logged error and parameters used to determine if the timing requirement of step 514 is met may then be erased, at step 510. The method may then be repeated periodically or non-periodically such as in response to an event.

In some embodiments, the methods described above may be implemented in systems having a plurality of system cooling fans and component cooling fans. Single PID controllers may generate control signals for single fans or for groups of fans. When a single PID controller generates control signals for a plurality of system and/or component cooling fans, deactivating the PID controller may affect all of the fans coupled to the PID controller by deactivating the fans or placing the fans in idle mode. In such embodiments, a comparison may be made of a received process value for each fan controlled by the PID controller with a set process value. The set process value may be different for each fan.

In some embodiments, the PID controller may be deactivated only when the received process values for each fan are within the deactivation conditions described above.

Figure 6:
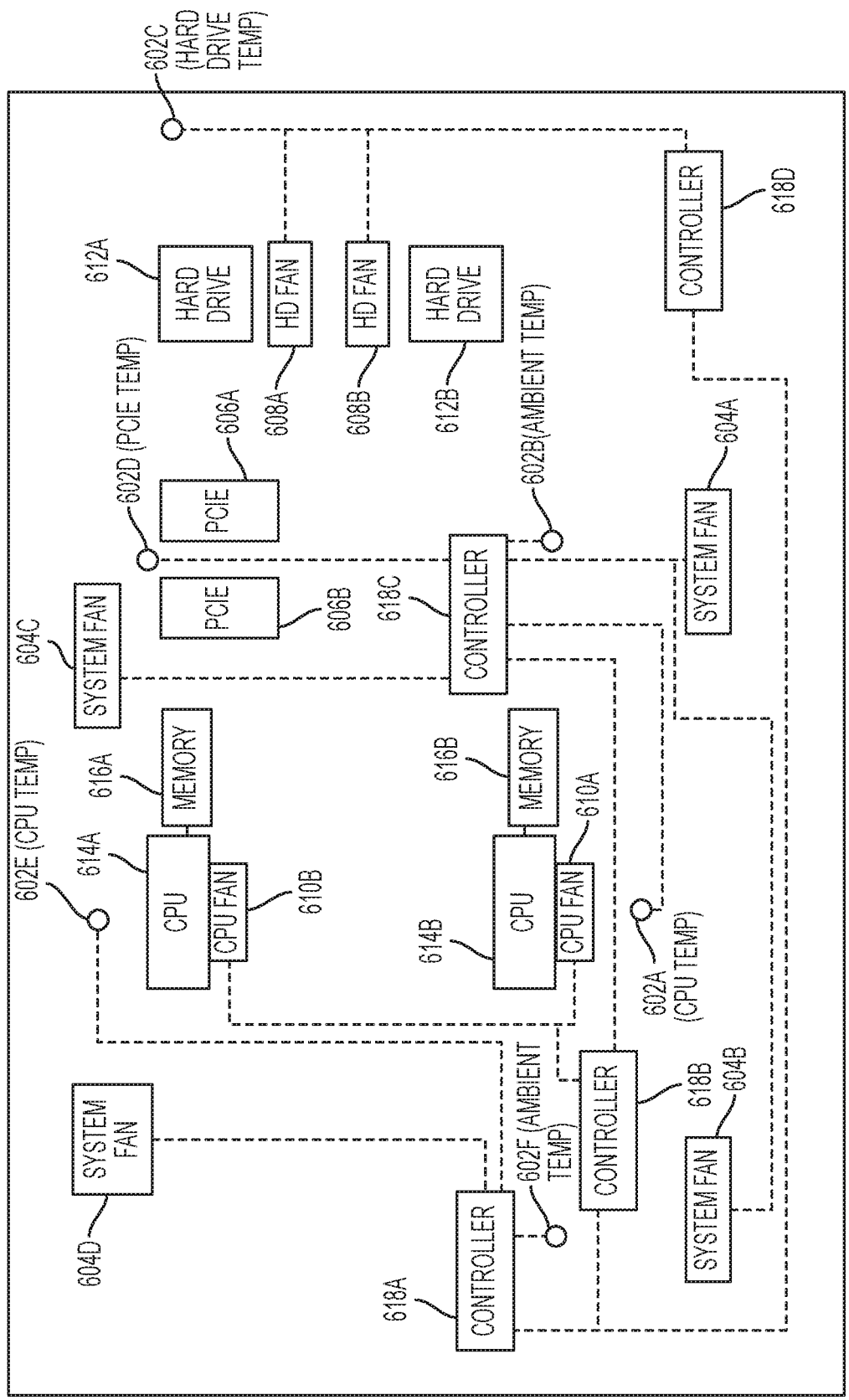
FIG. 6 is a diagram illustrating an information handling system with a cooling system according to some embodiments of the disclosure.

FIG. 6 is a block diagram illustrating an information handling system 600 according to some embodiments of the disclosure. An information handling system 600 may include a sensors for collecting data as to the environment of the information handling system, such as temperature sensors 602A-F. The system 600 may also include a system cooling fans, such as system fans 604A-D, and component cooling fans, such as CPU fans 610A-B and hard drive fans 608A-B. The system 600 may include one or more system components such as CPUs 614A-B, hard drives 612A-B, peripheral component interconnect express (PCIE) peripherals 606A-B, such as video cards, and memory units 616A-B. The system 600 may also include a variety of controllers, such as controllers 618A-D. The controllers 618A-D may receive data from the sensors in the form of process values. The controllers 618A-D may activate and deactivate PID controllers configured to generate control signals for the system fans 604A-D and component cooling fans 610A-B based, at least in part, on the data received from the temperature sensors 602A-F. Controllers 418A-D may be contained in a single chip configuration or may be located on separate chips. Controller 418B may be a master controller and may control operation of controllers 418A and 418C-D.

The schematic flow chart diagrams of FIG. 2, FIG. 3, FIG. 4, and FIG. 5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling a component cooling system of an information handling system, comprising:
    receiving a temperature margin of a system component;
    comparing the temperature margin of the system component to a set temperature margin;
    receiving a fan speed of a cooling fan of the information handling system;
    comparing the fan speed to an idle fan speed;
    activating a proportional-integral-derivative (PID) controller configured to generate a control signal for a cooling fan when the comparison indicates that the temperature margin of the system component is less than the set temperature margin; and
    deactivating the PID controller when the comparison indicates that the temperature margin of the system component is greater than or equal to the set temperature margin and the fan speed is less than or equal to the idle fan speed,
    wherein deactivating the PID controller comprises turning off the PID controller.

2. The method of claim 1, further comprising dynamically adjusting the set temperature margin based, at least in part, on the received system component temperature margin.

3. The method of claim 2, wherein the step of dynamically adjusting the set temperature margin comprises increasing the set temperature margin when the system component temperature margin is less than or equal to the set temperature margin.

4. The method of claim 2, wherein the step of dynamically adjusting the set temperature margin comprises decreasing the set temperature margin when the system component temperature margin is greater than the set temperature margin.

5. The method of claim 4, further comprising logging the system component temperature margin.

6. The method of claim 5, wherein the set temperature margin is decreased when the system component temperature margin has exceeded the set temperature margin by at least a set temperature for at least a set time period.

7. The method of claim 1, wherein the step of dynamically adjusting the set temperature margin comprises decreasing the set temperature margin when the system component temperature margin is greater than the set temperature margin.

8. The method of claim 7, further comprising logging the system component temperature margin.

9. The method of claim 8, wherein the set temperature margin is decreased when the system component temperature margin has exceeded the set temperature margin by at least a set temperature for at least a set time period.

10. An apparatus, comprising:
a controller configured to perform steps comprising:
receiving a temperature margin of a system component;
comparing the temperature margin of the system component to a set temperature margin;
receiving a fan speed of a cooling fan of the information handling system;
comparing the fan speed to an idle fan speed;
activating a proportional-integral-derivative (PID) controller configured to generate a control signal for a cooling fan when the comparison indicates that the temperature margin of the system component is less than the set temperature margin; and
deactivating the PID controller when the comparison indicates that the temperature margin of the system component is greater than or equal to the set temperature margin and the fan speed is less than or equal to the idle fan speed,
wherein deactivating the PID controller comprises turning off the PID controller.

11. The apparatus of claim 10, wherein the controller is further configured to perform steps comprising dynamically adjusting the set temperature margin based, at least in part, on the received system component temperature margin.

12. The apparatus of claim 11, wherein the step of dynamically adjusting the set temperature margin comprises increasing the set temperature margin when the system component temperature margin is less than or equal to the set temperature margin.

13. The apparatus of claim 11, wherein the step of dynamically adjusting the set temperature margin comprises decreasing the set temperature margin when the system component temperature margin is greater than the set temperature margin.

14. The apparatus of claim 13, wherein the controller is further configured to perform steps comprising logging the system component temperature margin.

15. The apparatus of claim 14, wherein the set temperature margin is decreased when the system component temperature margin has exceeded the set temperature margin by at least a set temperature for at least a set time period.

16. An apparatus for controlling a component cooling system of an information handling system, comprising:
a cooling fan; and
a controller coupled to the cooling fan to control the cooling fan;
wherein, the controller is configured to perform steps comprising:
receiving a temperature margin of a system component;
comparing the temperature margin of the system component to a set temperature margin;
receiving a fan speed of the cooling fan;
comparing the fan speed to an idle fan speed;
activating a proportional-integral-derivative (PID) controller configured to generate a control signal for the cooling fan when the comparison indicates that the temperature margin of the system component is less than the set temperature margin; and
deactivating the PID controller when the comparison indicates that the temperature margin of the system component is greater than or equal to the set temperature margin and the fan speed is less than or equal to the idle fan speed,
wherein deactivating the PID controller comprises turning off the PID controller.

17. The apparatus of claim 16, wherein the controller is further configured to perform steps further comprising dynamically adjusting the set temperature margin based, at least in part, on the received system component temperature margin.

18. The apparatus of claim 17, wherein the step of dynamically adjusting the set temperature margin comprises increasing the set temperature margin when the system component temperature margin is less than or equal to the set temperature margin.

* * * * *